Nov. 12, 1963 G. B. ROBERTS ETAL 3,110,314
CORN SAVER MECHANISM FOR A CORN HARVESTER
Filed May 2, 1962 2 Sheets-Sheet 2
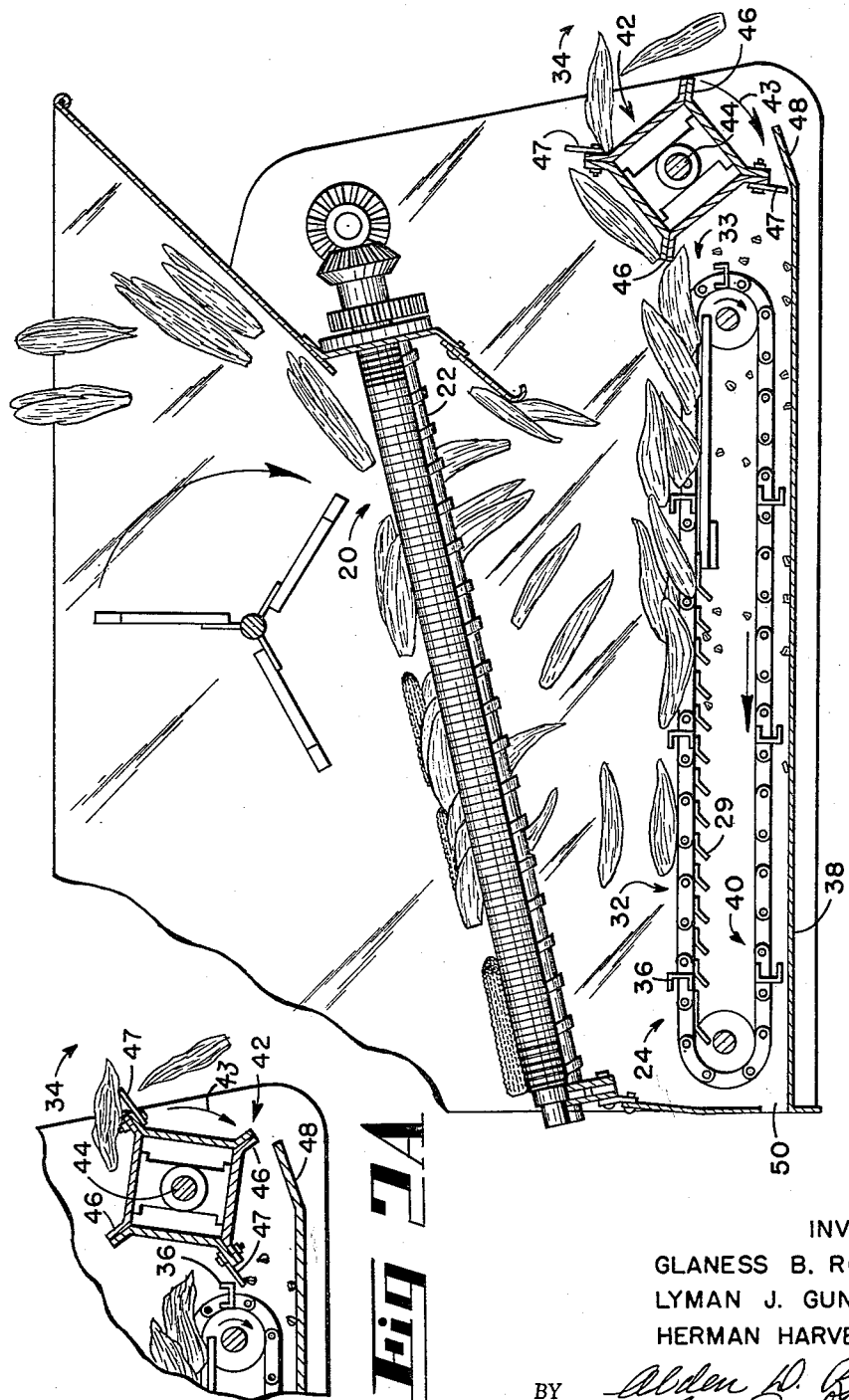
INVENTORS.
GLANESS B. ROBERTS.
LYMAN J. GUNYOU.
HERMAN HARVEY SCHULZE
BY
ATTORNEYS.

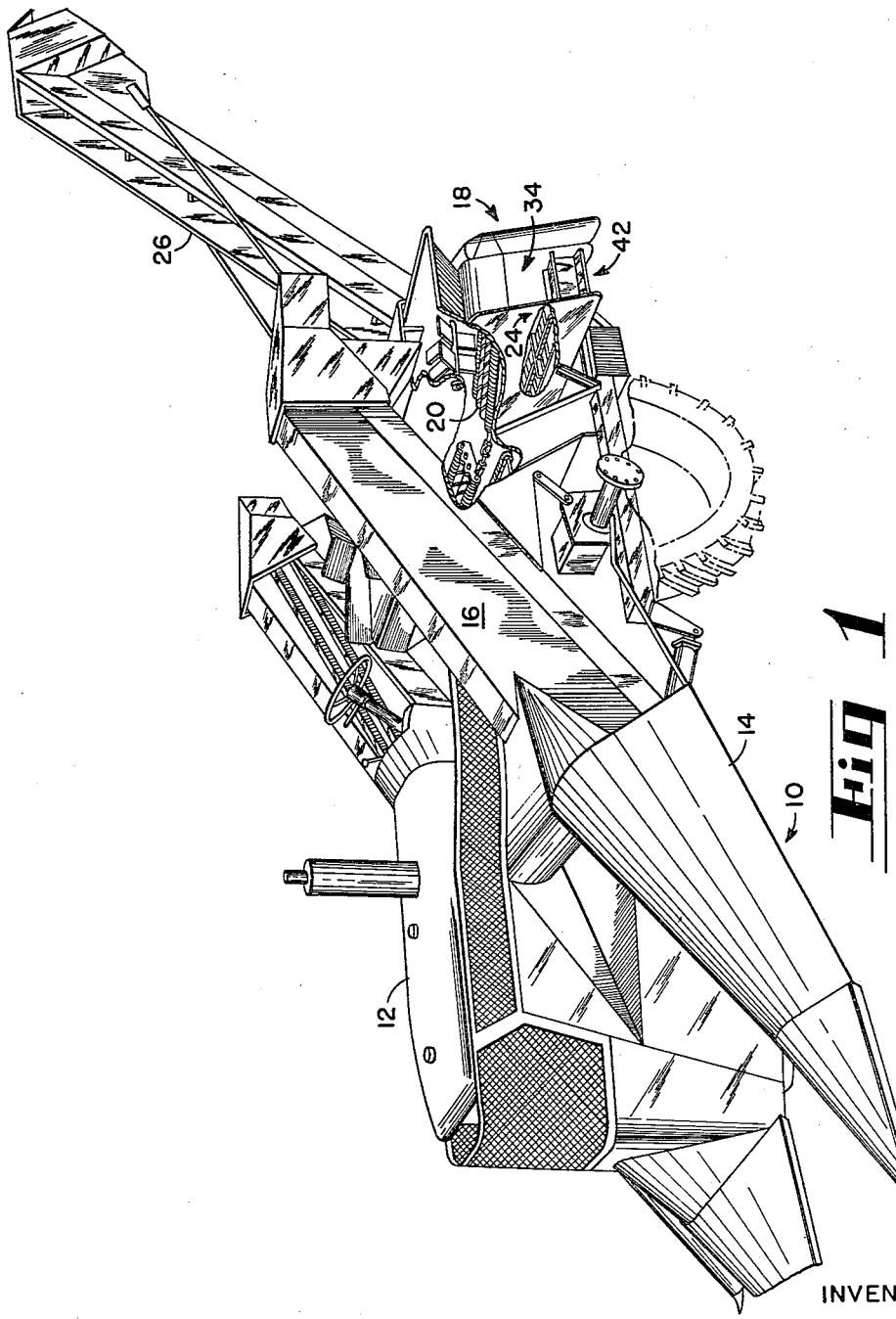

3,110,314
CORN SAVER MECHANISM FOR A CORN HARVESTER

Glaness B. Roberts, Fort Recovery, Lyman J. Gunyou, Celina, and Herman Harvey Schulze, Coldwater, Ohio, assignors to Avco Corporation, Coldwater, Ohio, a corporation of Delaware
Filed May 2, 1962, Ser. No. 191,780
1 Claim. (Cl. 130—5)

This invention relates to an improvement in a corn saver mechanism adapted for use with corn husking devices.

Although not so limited, the device here disclosed is primarily useful in field units wherein corn ears are first snapped from standing stalks with the husks thereon and subsequently carried to husking units rearwardly positioned on combined snapping and husking assembly mounted on a tractor for picking and husking one or more rows of corn while driving a tractor with the so-called picker assembly mounted thereon along the rows of corn.

It is a primary object of the invention to improve the mechanism by which kernels of corn, inadvertently shelled from ears of corn during the removal of the husks from the ears, are separated from the husks before the husks are ejected from the husking unit.

It is a further object to provide an improvement in a corn saver mechanism which more satisfactorily agitates the husks with shelled corn carried therein so as to shake out shelled kernels and to deposit them in a portion of the corn saver unit so that they may be saved prior to the ejection of the husks from the husking unit.

It is a further object to provide a so-called husk agitator drum adjacent one end of the corn saver unit, with such drum having an upper peripheral portion thereof substantially above the adjacent portions of the corn saver so that husks ejected from the unit by said husk agitator drum may be satisfactorily agitated by said drum, thereby to lift and to agitate husks and to shake out residual kernels of corn carried in the husks prior to the time the husks are ejected from the mechanism.

It is another object to provide means for assuring the ejection of material known as corn "silks" with the husks and to prevent such silks, as well as other material, from being carried by a corn saver conveyor mechanism out with the shelled corn. Corn silks are threadlike fibrous material which, like the husks, are separated from the ears in the husking process.

The above and other objects of the invention will appear more fully from the following more detailed description and by reference to the accompanying drawings forming a part hereof and wherein:

FIGURE 1 is a perspective view of a corn picker assembly including snapping and husking units assembled on a tractor.

FIGURE 2 is a section on an enlarged scale through the husking and corn saver assembly unit showing the combination of mechanism accomplishing the improvement in agitation of the husks to more effectively separate kernels from the husks prior to the time the husks are ejected from the husking unit.

FIGURE 2A is a fragmentary section and view of a portion of FIG. 2 showing a position of the husk agitator drum and a projecting resilient flap thereon contacting the end of the conveyor to wipe material, such as silks, from the conveyor and to assure movement thereof with the husks.

Referring to FIGURE 1, there is shown a picking and husking mechanism commonly called a corn picker, generally designated by the reference numeral 10, shown mounted on a tractor 12. The unit shown is a mechanism for picking and husking corn from two rows of corn adjacent the sides of the tractor. The picking assembly 14, similar on both sides of the tractor, first snaps ears of corn from the standing stalks and by the elevator assembly 16 carries the snapped ears with the husks still on and ejects these snapped ears into the husking unit 18, shown in cutaway view in FIGURE 1. Husking unit 18 has a so-called husking bed 20 which comprises a plurality of counter-rotating husking rolls 22 forming a bed upon which ears of corn with the husks thereon fall and are carried in a downward direction down the inclined husking bed 20, shown best in FIGURE 2. As these ears of corn are carried over the husking bed over the counter-rotating husking rolls, the rolls pull the husks from the ears and eject the husks downwardly as shown in FIGURE 2, and the husks fall by gravity downwardly upon an endless conveyor 24. The effect of the husking rolls is to pick off the husks from the ears of corn and to move the husks downwardly between the rolls and allow each ear of corn with its husk removed to move downwardly toward the central portion of the husking unit, the central portion 12 being connected to the elevator 26, which carries the husked ears upwardly to be discharged from the elevator into a trailing wagon. The husks, as shown in FIGURE 2, fall on top of a grate 29, and these husks which fall from the husking roll have mixed with them a relatively small quantity of shelled kernels of corn which are inadverntently shelled from the ears during the husking process. This deficiency, so-called, in the husking of corn is a source of loss if not recovered, and is of course minimized to the greatest extent by improving the efficiency of the husking rolls by the provision of rubber covering and special shapes and sizes, as is well known in the art. However, no matter what efficiency is obtained, there is remaining a certain amount of shelled corn mixed with the husks which is well worth saving. The corn saver assembly 30 comprises the endless conveyor 24, the top flight 32 of which moves over a grate 29 toward the right, as shown in FIGURE 2, toward the conveyor outlet end 34. The husks are thereby carried by this conveyor toward the husk outlet 34 over the grate 29, and the slats 36 of the conveyor tend to move the husks toward the outlet 34. The conveyor 24, moving over grate 29, causes a certain amount, generally a major portion, of the shelled corn to fall through the grate 29 downwardly to the lower grate 38 of the corn saver. The return flight 40 of the endless conveyor thus serves to carry these kernels of corn over the lower grate 38 toward an outlet 50 opposite from the husk outlet. The size of the openings in this grate 38 are such that the corn kernels do not fall therethrough, but smaller particles do fall through this grate and thus screen the saved kernels of corn.

The mechanism so far disclosed is a conventional type of corn saver long known in the art. However, it has been found that the amount of agitation accomplished by the top flight of the conveyor 32 is not sufficient to completely shake out the kernels of corn carried in the husks, and it is the improvement of this invention to provide a mechanism to work in combination with the aforesaid parts of the corn saver, i.e., the endless conveyor 24 and the top and bottom grates 29 and 38, this additional mechanism being a so-called agitator drum 42 mounted for rotation on a driven shaft 44. The agitator drum has a plurality of radially projecting vanes 46. The shaft 44 is positioned in such relation to the conveyor that the peripheral portion of the drum 42, and particularly the vanes 46 thereof, rotate in their maximum upward position substantially above the plane of the top of the upper conveyor flight 32 of conveyor 24.

The agitator drum 42 is positioned by the shaft 44 in a location such that the ends of radially extending vane portions 46 of said drum are movable on rotation of the drum contiguous to the discharge end 33 of the upper flight 32 of the conveyor 24, and further, the direction of rotation of such agitator drum, as shown by the arrow 43, is such that the said extending vane 46 portions move upwardly relative to husks moving from the discharge end 33 of said conveyor flight 32, thereby to lift and to agitate the husks upwardly from the end of said conveyor while assisting the movement of said husks toward the husk outlet 34. An extending portion 48 of the lower grate 38, which receives shelled corn, extends under the husk agitator drum 42, thus to receive the kernels of corn shaken from the husks thus agitated by the agitator drum 42, thereby to save an additional quantity of shelled corn by thus positively agitating the husks prior to their discharge from the husk discharge outlet 34. The kernels of corn shaken out by drum 42 fall downwardly adjacent the upwardly inclined extending portion 48 of the lower grate 38, so that such kernels which fall downwardly are picked up by the lower flight 40 of the conveyor and are thereby carried to the left-hand end of the conveyor and are discharged from the shelled corn outlet 50. The shelled corn in the illustrated mechanism may be carried by the elevator 26 into the trailing wagon along with the ears which fall from the top surface of the husking roll.

As shown in FIGURES 2 and 2A, projecting flaps 47 are provided on the drum 42 and are shown attached to two of the vaned portions 46. These projecting flaps 47 are of resilient material, such as rubber, and extend lengthwise of the agitator drum 42, and, as shown in FIGURE 2A, these projecting flaps are of such length radially from the drum 42 as to contact and wipe the slats 36 of the conveyor 24 adjacent discharge end 33 thereof. One or more such resilient flaps might be used. This wiping contact by the flaps prevents the conveyor 24 from carrying corn silks, or other material, back into the shelled corn discharge end of the corn saver and assures its movement and discharge with the husks, thereby preventing this material from being carried to the outlet 50 with the shelled corn.

Although the invention has been described by reference to an illustrative structure found practical in actual operation, it is intended that modifications may be made without departing from the fundamental principles and within the scope of the following claim.

We claim:

In a corn saver mechanism of the type operable with and positioned under a husking roll assembly in which husks, removed from ears of corn by said assembly, fall downwardly toward said corn saver mechanism together with a certain quantity of shelled corn inadvertently shelled during the husking, said corn saver mechanism comprising:

a conveyor operable to move husks transversely toward its discharge end from the region under said husking roll assembly toward a husk outlet;

shelled corn receiving means under said conveyor;

a husk agitator drum located adjacent the end of said conveyor and between the end of the conveyor and said husk outlet;

radially extending vane portions of said drum with the ends thereof movable contiguous to the discharge end of said conveyor;

one or more of said vane portions comprising resilient flap members also secured to said drum and extending radially therefrom of a length sufficient to contact and wipe said conveyor on rotation of said drum;

means for rotating said drum in a direction to cause said extending vane portions and said flap members of said drum to move upwardly relative to husks moving from the end of said conveyor, thereby to wipe said conveyor with said flap member and to lift husks and silks upwardly from the end of said conveyor while assisting the movement of said husks and silks toward said husk outlet;

a portion of said shelled corn receiving means extending under said husk agitator drum;

whereby said husk agitator drum both assists in ejecting said husks and silks and in agitating said husks to remove shelled corn therefrom prior to ejection.

References Cited in the file of this patent

UNITED STATES PATENTS

| | | |
|---|---|---|
| 705,311 | Alexander et al. | July 22, 1902 |
| 2,649,760 | Gustafson | Aug. 25, 1953 |